Oct. 23, 1956

W. L. PIESCHEL ET AL 2,767,948

PORTABLE RECEPTACLE

Filed June 8, 1953

INVENTOR.
WALTER L. PIESCHEL
BY GEORGE E. RADCLIFFE

Zugelter & Zugelter
Attys.

United States Patent Office 2,767,948
Patented Oct. 23, 1956

2,767,948

PORTABLE RECEPTACLE

Walter L. Pieschel, Ludlow, Ky., and George E. Radcliffe, Cincinnati, Ohio, assignors to The Coca-Cola Bottling Works Company, Cincinnati, Ohio, a corporation of Ohio Application June 8, 1953, Serial No. 360,246

2 Claims. (Cl. 248—151)

This invention relates to a portable bottle cooler for refrigerated storage of bottles, cans, or other containers or the like, and more particularly relates to a light-weight portable receptacle and to removable supports or legs therefor.

An object of this invention is to provide a portable cooler having substantially inverted T-shaped leg members at the opposite ends thereof which are demountable to render the receptacle readily portable.

A further object of this invention is to provide a receptacle having tubular members at the ends thereof for receiving the upright portions of inverted T-shaped leg members.

A further object of this invention is to provide leg members of this type which have means for supporting the bottom of the container.

A further object of this invention is to provide such T-shaped leg members formed of bent tubing or the like in which the upright portion is formed by two parallel ends thereof and in which the upright portions are received in sleeves each of which has a pair of partially circular portions forming parallel sleeves divided by a fin.

From the following description, and the accompanying drawing, the above and other objects and features of the invention will be apparent to those having ordinary skill in the art to which it pertains.

In the drawing.

In the following detailed description, and the drawing, like reference characters indicate like parts.

Figure 1:
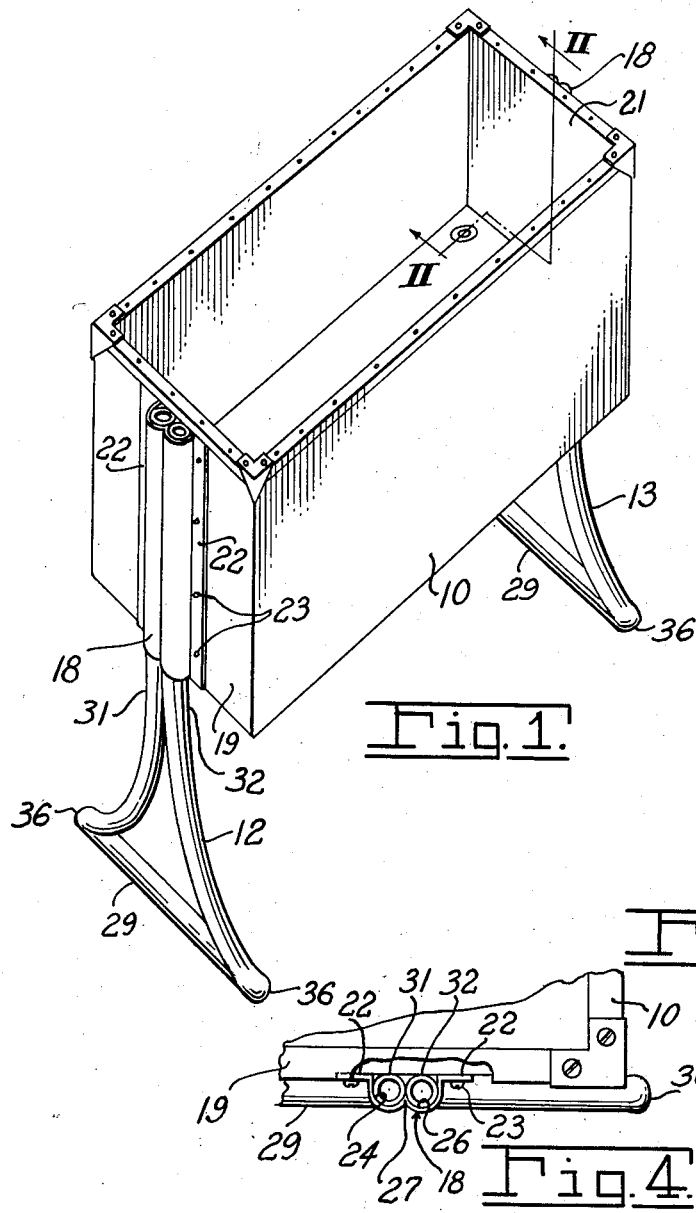
Figure 1 is a perspective view showing a bottle cooler constructed in accordance with an embodiment of this invention.
Figure 2:
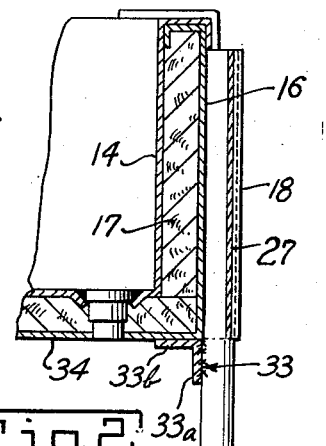
Fig. 2 is a view in section taken along a line II—II in Fig. 1.

In Fig. 1 is shown a receptacle 10 and receptacle-supporting leg members 12 and 13. The receptacle is elongated, substantially rectangular, and open at the top, and of double-walled insulated construction, as shown in Fig. 2. The inner and outer walls 14 and 16 are of sheet metal or the like. Insulation 17 may be of suitable light-weight board-type thermal insulation and may include boards of appropriate size and shape to fill the side walls and the bottom of the receptacle.

Sleeve members 18 (only one such is shown in detail) are attached to the end walls 19 and 21 of the receptacle. Each sleeve member 18 includes flanges 22 which are attached to the end wall of the container by appropriate screws or the like 23. The sleeve member includes a central portion between the flanges which is bent to form a pair of parallel portions 24 and 26 (see Fig. 4) which are separated or divided by a fin 27. Each sleeve removably receives one of the leg members.

Figure 3:
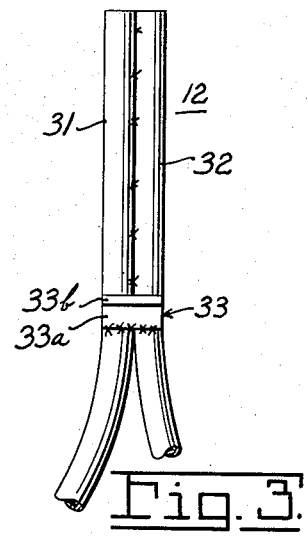
Fig. 3 is a fragmentary view in side elevation of one of the leg members, the leg member being removed from the receptacle portion of the cooler.

As shown in Figure 1, the leg member 12 is formed from a length of tubing bent to substantially an inverted T-shape. The cross member 29 of member 12 is adapted to rest on the ground with upright end portions 31 and 32 in side by side relation. The upright portions 31 and 32 may be soldered together, as shown in Fig. 3, or otherwise held in engagement. An angle shaped support member 33 (Figs. 2 and 3) is soldered or brazed to the inside faces of members 31 and 32. One flange 33a of support member 33 is soldered flatwise against the upright portions 31 and 32, while the other flange 33b projects horizontally therefrom. As shown in Fig. 2, when the upright portions of leg member 12 are inserted into sleeve 18, flange 33b of the angle member 33 underlies the bottom 34 of the receptacle to support the bottom of the receptacle. The fin 27 lies between the upright portions with the upright portions of the leg member received in the parallel portions of the sleeve.

Figure 4:
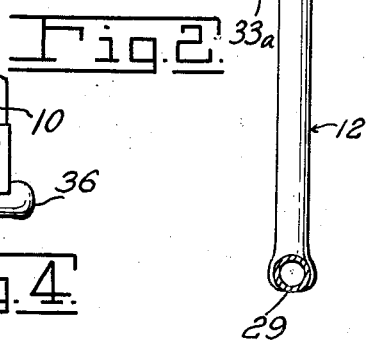
Fig. 4 is a fragmentary plan view of the top of one end of the cooler.

The leg members firmly support the bottom of the receptacle. As indicated in Fig. 4, the ends 36 of the ground engaging cross member of leg member 12 project outboard of the receptacle so that the leg members give the receptacle a firm support. When the receptacle is to be moved, the leg members can readily be demounted to render the receptacle readily portable.

The receptacle illustrated in the drawing and described above is subject to structural modification without departing from the spirit or scope of the appended claims.

Having described our invention, what we claim as new and desire to secure by Letters Patent is:

1. A portable bottle cooler comprising an open-topped receptacle having spaced end plates, an upright sleeve attached to each end plate, and a receptacle support removably received in each sleeve, each of said sleeves comprising a vertically extending member having a pair of partially circular portions having parallel sections divided by a fin, each of the receptacle supports comprising a pair of elongated members having their upper end portions parallel and adjacent and received in the sections of one of the sleeves, the lower portions of the elongated members diverging downwardly thereof, and an angle member spanning and attached to both of the elongated members of the receptacle support underlying the receptacle to support the receptacle.

2. A portable bottle cooler comprising an open-topped receptacle having spaced end plates, an upright open ended sleeve substantially co-extensive with the height of the end plates attached to each end plate, and a receptacle support removably received in each sleeve, each of the receptacle supports comprising a pair of elongated members having their upper portions parallel and adjacent and received inside one of the sleeves, the lower portions of the elongated members diverging downwardly with the lower ends thereof connected by a horizontal base member, and an angle member having one flange spanning and attached to both of the elongated members of the receptacle support immediately adjacent the lower end of the sleeve, the other flange of the angle member projecting directly under and engaging the bottom of the receptacle to support the receptacle on the elongated members.

References Cited in the file of this patent

UNITED STATES PATENTS

| | | |
|---|---|---|
| 528,382 | Obermann | Oct. 30, 1894 |
| 1,192,557 | Pfeffer | July 25, 1916 |
| 1,305,983 | Wills | June 3, 1919 |
| 2,077,829 | Erickson | Apr. 20, 1937 |
| 2,345,976 | Hillberg | Apr. 4, 1944 |
| 2,540,756 | Radcliffe | Feb. 6, 1951 |
| 2,673,596 | Von Haase | Mar. 30, 1954 |